(12) United States Patent
Nowatzki et al.

(10) Patent No.: US 10,216,693 B2
(45) Date of Patent: Feb. 26, 2019

(54) COMPUTER WITH HYBRID VON-NEUMANN/DATAFLOW EXECUTION ARCHITECTURE

(71) Applicant: Wisconsin Alumni Research Foundation, Madison, WI (US)

(72) Inventors: Anthony Nowatzki, Madison, WI (US); Vinay Gangadhar, Madison, WI (US); Karthikeyan Sankaralingam, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 370 days.

(21) Appl. No.: 14/813,945

(22) Filed: Jul. 30, 2015

(65) Prior Publication Data

US 2017/0031866 A1 Feb. 2, 2017

(51) Int. Cl.
*G06F 15/82* (2006.01)
*G06F 9/38* (2018.01)
*G06F 1/3296* (2019.01)
*G06F 1/324* (2019.01)
*G06F 1/3287* (2019.01)

(52) U.S. Cl.
CPC .......... *G06F 15/825* (2013.01); *G06F 9/3836* (2013.01); *G06F 9/3897* (2013.01); *G06F 1/324* (2013.01); *G06F 1/3287* (2013.01); *G06F 1/3296* (2013.01); *Y02D 10/126* (2018.01); *Y02D 10/171* (2018.01)

(58) Field of Classification Search
CPC ............................. G06F 9/3877; G06F 9/3897
See application file for complete search history.

(56) References Cited

U.S. PATENT DOCUMENTS

| | | | | |
|---|---|---|---|---|
| 2006/0095721 | A1* | 5/2006 | Biles | G06F 8/44 712/34 |
| 2007/0220235 | A1* | 9/2007 | Yehia | G06F 9/3802 712/205 |
| 2008/0263332 | A1* | 10/2008 | Yehia | G06F 9/30181 712/220 |
| 2012/0303932 | A1* | 11/2012 | Farabet | G06F 15/7867 712/30 |
| 2014/0351563 | A1* | 11/2014 | Vorbach | G06F 9/3885 712/221 |

OTHER PUBLICATIONS

Sami Yehia, Nathan Clark, Scott Mahlke, Krisztian Flautner. "Exploring the Design Space of LUT-based Transparent Accelerators" CASES'05, Sep. 24-27, 2005.*

(Continued)

*Primary Examiner* — Jacob Petranek
(74) *Attorney, Agent, or Firm* — Boyle Fredrickson, S.C.

(57) ABSTRACT

A dataflow computer processor is teamed with a general computer processor so that program portions of an application program particularly suited to dataflow execution may be transferred to the dataflow processor during portions of the execution of the application program by the general computer processor. During this time the general computer processor may be placed in partial shutdown for energy conservation.

23 Claims, 4 Drawing Sheets

(56) References Cited

OTHER PUBLICATIONS

Nathan Clark, Amir Hormati, Scott Mahlke. "VEAL: Virtualized Execution Accelerator for Loops" Proceeding ISCA '08 Proceedings of the 35th Annual International Symposium on Computer Architecture pp. 389-400. Jun. 21-25, 2008.*

Joao Bispo, Joao M. P. Cardoso, Jose Monteiro. "Hardware pipelining of runtime-detected loops" 2012 IEEE.*

Yijun Liu, Steve Furber, Zhenkun Li. "The Design of a Dataflow Coprocessor for Low Power Embedded Hierarchical Processing" PATMOS 2006.*

Clement Farabet, Berin Martini, Benoit Corda, Polina Akselrod, Eugenio Culurciello, Yann LeCun, "NeuFlow: A Runtime Reconfigurable Dataflow Processor for Vision" CVPR 2011 Workshops, Jun. 20-25, 2011. (Year: 2011).*

Arvind et al.; "Executing a program on the MIT tagged-token dataflow architecture."; Computers, IEEE Transactions on 39, No. 3 (1990): pp. 300-318; MA.

Clark et al.: "Application-specific processing on a general-purpose core via transparent instruction set customization," In Microarchitecture, 2004. MICRO-37 2004, 37th International Symposium on, pp. 30-40. IEEE, 2004; US.

Govindaraju et al.; "Dynamically specialized datapaths for energy efficient computing." In High Performance Computer Architecture (HPCA), 2011 IEEE 17th International Symposium on, pp. 503-514. IEEE. 2011. Wisonain.

Gupta et al.; "Bundled execution of recurring traces for energy-efficient general purpose processing." In Proceedings of the 44th Annual IEEE/ACM International Symposium on Microarchitecture, pp. 12-23. ACM. 2011; Brazil.

Hayenga et al.; "Revolver: Processor architecture for power efficient loop execution." In High Performance Computer Architecture (HPCA), 2014 IEEE 20th International Symposium on, pp. 591-602. IEEE. 2014; US.

Sankaralingam et al.; "Distributed microarchitectural protocols in the TRIPS prototype processor." In Microarchitecture, 2006. MICRO-39. 39th Annual IEEE/ACM International Symposium on, pp. 480-491. IEEE, 2006; Texas.

Swanson et al.; "The wavescalar architecture." ACM Transactions on Computer Systems (TOCS) 25, No. 2 (2007): 4 Washington.

* cited by examiner

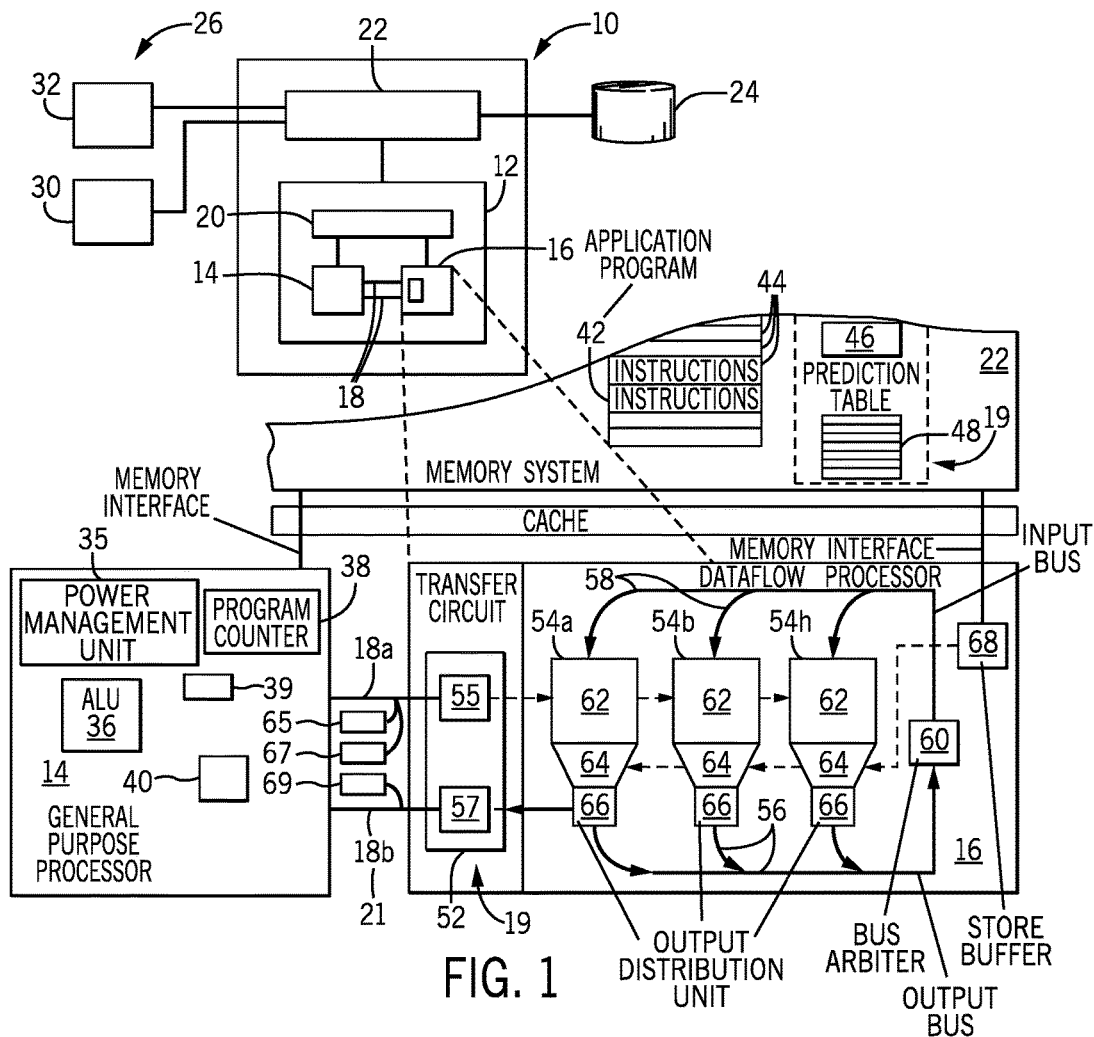
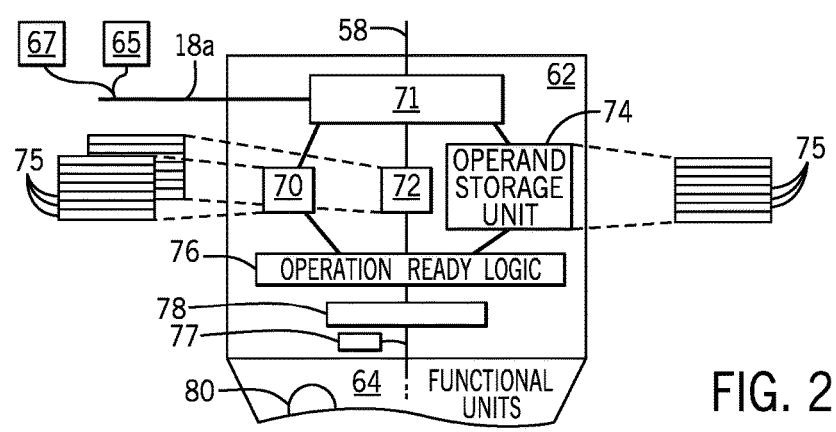

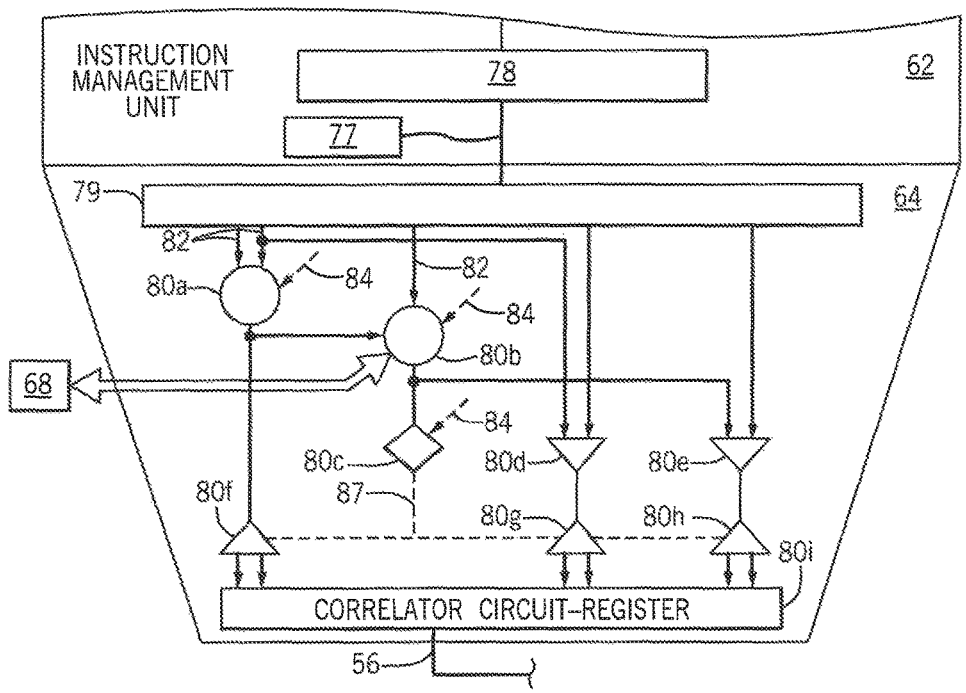
FIG. 3
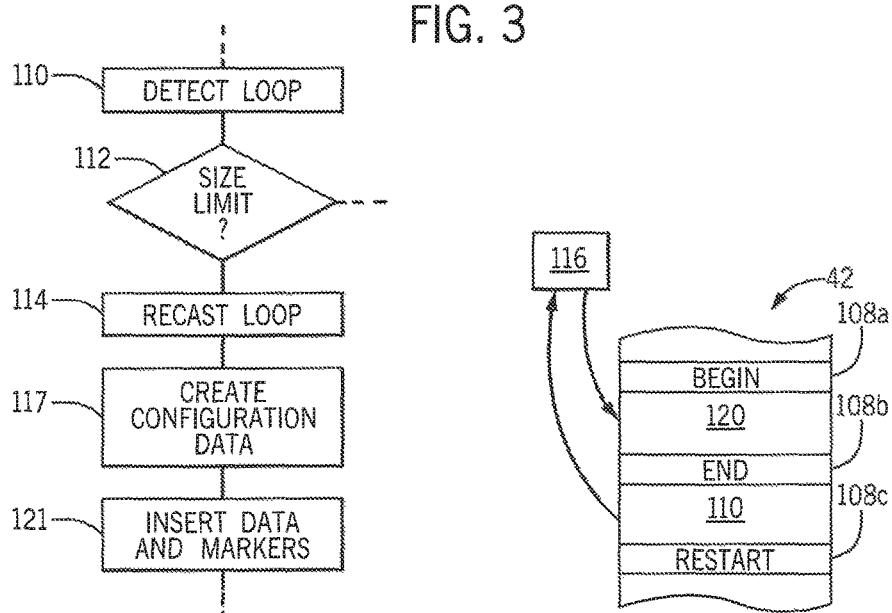
FIG. 6
FIG. 7

COMPUTER WITH HYBRID VON-NEUMANN/DATAFLOW EXECUTION ARCHITECTURE

STATEMENT REGARDING FEDERALLY SPONSORED RESEARCH OR DEVELOPMENT

This invention was made with government support under 1218432 awarded by the National Science Foundation. The government has certain rights in the invention.

CROSS REFERENCE TO RELATED APPLICATION

N/A

BACKGROUND OF THE INVENTION

The present invention relates to computer architectures and in particular to an improved computer architecture blending features of a Von Neumann computer and a dataflow execution computer.

In a common general-purpose computer, a sequence of stored instructions is executed in an instruction sequence controlled by a program counter. The instructions may perform operations on data (for example, add and multiply instructions) or may read data to control the flow of the program among instruction (for example, branch instructions). Each instruction is generally executable in sequence on a single integrated arithmetic logic unit. These architectures will be termed herein "Von Neumann architectures" or control flow architectures. Such computer architectures receive a program of instructions and initial data values for execution.

An alternative architecture, termed herein a "dataflow architecture", represents programs and executes by modeling a flow of data between different functional units much like electrical data flowing between circuit elements that are wired together. The functional units execute in a sequence determined by the availability of data rather than according to a Von Neumann type program counter and generally the data processed by the dataflow architecture is operated on by many independent functional units as it flows among the functional units. The ability of many functional units to execute data simultaneously in a dataflow architecture makes dataflow architectures promising for implementing instruction level parallelism and thereby obtaining higher processing speeds than available with Von Neumann architectures where instructions are executed sequentially according to a program counter value.

Despite the potential advantages of dataflow architectures, dataflow architecture computers show no signs of replacing conventional Von Neumann machines for general computing tasks. Control flow speculation is difficult to implement with dataflow architectures and the intercommunication of data values between functional units can be costly in terms of time and hardware. The problem of compiling an arbitrary Von Neumann architecture program as a dataflow architecture program is challenging . . . .

SUMMARY OF THE INVENTION

The present inventors have recognized that many application programs have portions that are particularly suited for execution on a dataflow architecture even if that is not true with the entirety of the application program. Accordingly, the invention provides a hybrid Von Neumann/dataflow architecture that may switch between execution modes on a general-purpose processor or dataflow processor for different parts of an application program. By properly selecting the portions of the application program to be executed on the dataflow computer processor, the problems normally associated with dataflow computer processing may be avoided, and portions of the program difficult to execute on a dataflow computer processor may be executed by the general-purpose computer processor. In one important embodiment, the dataflow architectures may be used to execute in-line nested loop structures typically having simplified control flow and limited or localized dataflow well suited for dataflow execution.

More specifically, in one embodiment, the invention provides a computer with improved function comprising a general computer processor communicating through transfer circuitry with a dataflow computer processor. The general computer processor includes: (a) a memory interface for exchanging data and instructions with an electronic memory; (b) an arithmetic logic unit receiving input data and instructions from the memory interface to process the same and to provide output data to the memory interface; and (c) a program counter identifying instructions for execution by the arithmetic logic unit. The dataflow computer processor includes: (a) a memory interface for exchanging data and instructions with electronic memory; (b) multiple functional units interconnected to receive input data from the memory interface or other functional units and providing output data to the memory interface or other functional units; and (c) an interconnection control circuit controlling the interconnection of the multiple functional units to exchange data according to the dataflow description. The transfer interface operates to transfer the execution of an application program between the general purpose computer processor and the dataflow computer processor and: (a) at the beginning of a set of instructions of the application program executable on the dataflow computer processor, switching execution from the general computer processor to the dataflow computer processor and providing to the dataflow computer processor a dataflow description of the set of instructions; and (b) at a completion of execution of the set of instructions by the dataflow computer processor returning execution to the general computer processor.

It is thus a feature of at least one embodiment of the invention to overcome the deficiencies of dataflow architectures in handling common program structures by dynamically switching to dataflow architecture during only selected portions of an application's lifetime where dataflow architectures have an advantage. Remaining portions of the program may be executed by a general computer processor.

The general computer processor may include a low-power and a high-power operating mode and the computer may move the general computer processor to the low-power mode at the beginning of the set of instructions and to the high-power mode at the completion of execution of the set of instructions.

It is thus a feature of at least one embodiment of the invention to exploit the improved power efficiency of a dataflow processor to reduce total computer power consumption and heat generation.

The computer may include a prediction table tracking execution on the dataflow computer processor of the set of instructions of the application as linked to the set of instructions, and the computer may switch execution from the general computer processor to the dataflow computer processor for a given set of instructions only when the prediction table tracking for previous execution of a given set of instructions indicates likelihood of a predetermined benefit in execution of the transfer.

It is thus a feature of at least one embodiment of the invention to provide run time refinement of the criteria for selecting program portions best executed by the dataflow computer processor or to permit runtime variation in the allocation of program portions between the general-purpose processor and dataflow processor to permit a flexible trade-off between power consumption and speed. The prediction table may, for example, measure execution time or number of executed instructions to ensure that the transfer process is justified based on the ability of the dataflow processor to process substantial portions of the application and the desired speed performance requirements.

The functional elements of the dataflow processor may execute in multiple sequential time steps in between which configuration of the components of the functional elements and their interconnection may be changed.

It is thus a feature of at least one embodiment of the invention to permit a relatively modest number of functional elements to implement substantial portions of the application program by time sequencing. This allows a low area, low-power dataflow computer processor that may be integrated with the general-purpose core.

The dataflow computer processor includes registers for storage of data between time steps.

It is thus a feature of at least one embodiment of the invention to allow data generated and consumed within the application portion to remain largely within the dataflow computer processor for reduced latency.

The computer may identify in-line instruction loops providing one or more loops of control flow, where the loops do not include input-output operations or atomic operations as the set of instructions for transfer to the dataflow processor.

It is thus a feature of at least one embodiment of the invention to process loops using a dataflow computer such as provide a tractable dataflow problem. The present inventors have determined that nested loops suitable for execution on the system can comprise a substantial amount (as much is 80 percent) of a typical application program.

The general computer processor may execute a transfer program identifying a beginning of the set of instructions and enabling operation of the transfer interface in switching execution from the general computer processor to the dataflow computer processor. In addition, the dataflow computer processor may employ the dataflow description to identify a completion of execution of the set of instructions to enable operation of the transfer interface and return execution to the general computer processor.

It is thus a feature of at least one embodiment of the invention to employ the general computer processor and the dataflow computer processor to simplify the hardware required in this present design.

The transfer circuit at the beginning of the set of instructions may further transfer initial data values for the functional units.

It is thus a feature of at least one embodiment of the invention to provide for the efficient transfer of current variable values to the dataflow processor to minimize transfer time.

The computer may identify the beginning of the set of instructions from special instructions in the application program.

It is thus a feature of at least one embodiment of the invention to provide reduced hardware requirements by allowing pre-processing of the application program to identify instructions to transfer to the dataflow computer processor.

The dataflow description may be embedded in the application program executed by the general computer processor.

It is thus a feature of at least one embodiment of the invention to permit preprocessing of the conversion of an application program to dataflow descriptions necessary for dataflow processing.

The set of instructions may be limited to a predefined maximum number of static instructions.

It is thus a feature of at least one embodiment of the invention to provide for an efficient hybrid computing platform possible by limiting the size of the program portions transferred and hence the necessary size and complexity of the dataflow computer processor. Limiting the number of static instructions greatly increases the complexity of tracking and managing dataflow.

The multiple functional units of the dataflow computer may be interconnected by a bus structure that may interconnect only a subset less than the full set of functional units at a given time.

It is thus a feature of at least one embodiment of the invention to permit a simplified bus structure reducing the complexity of the dataflow computer processor.

The general computer processor and dataflow computer processor may both communicate with a common cache through the memory interfaces.

It is thus a feature of at least one embodiment of the invention to eliminate the need for the transfer of significant amounts of data between the general computer processor and the dataflow computer processor (for example, through data copying through memory) and to preserve cache coherence.

These particular objects and advantages may apply to only some embodiments falling within the claims and thus do not define the scope of the invention.

BRIEF DESCRIPTION OF THE FIGURES

FIG. 1 is a block diagram of a computer of the present invention having a general computer processor and dataflow computer processor showing an expanded detail of a dataflow computer processor employing multiple dataflow elements each including an instruction management unit, a compound functional unit, and an output distribution unit;

FIG. 2 is a detailed block diagram of an instruction management unit of FIG. 1;

FIG. 3 is a detailed block diagram of an example compound functional unit of FIG. 1 per the present invention;

FIG. 6 is a flowchart of a compiler that may work with the present invention; and FIG. 7 is a representation of a portion of an application program modified by the compiler of FIG. 6 to work with the computer of the present invention.

DETAILED DESCRIPTION OF THE PREFERRED EMBODIMENT

Figure 4:
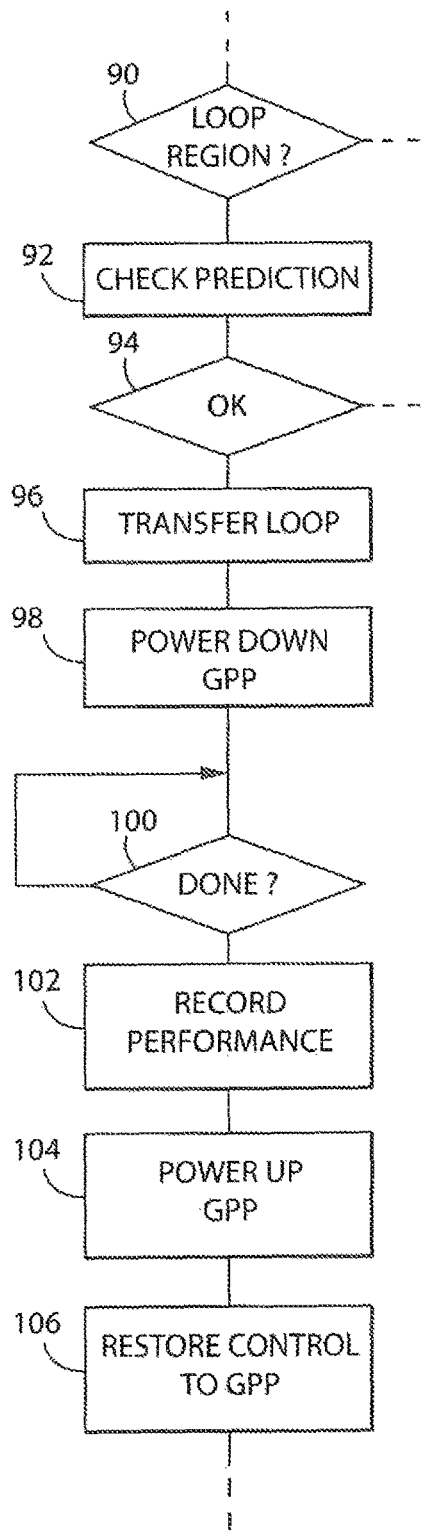
FIG. 4 is a flowchart of the operation of a transfer circuit for transferring control between the general computer processor and dataflow processor.

Referring now to FIG. 1, a computer system 10 suitable for use with the present invention may include a computer 12 having an interconnected general-purpose processor (GPP) 14 and an explicit dataflow processor (EDP) 16 communicating with each other by transfer lines 18 and transfer circuit 19.

Each of the GPP 14 and EDP 16 may also communicate with a shared L1 cache and address translation unit 20 which in turn communicates via a high-level memory system 22, of a type known in the art and including higher-level caches, memory, and a system bus, with external memory 24 including random access memory and nonvolatile storage such as a hard drive, and other peripheral devices 26, for example, including a network connection circuit 30 and a user interface 32, for example, including a display, keyboard, mouse and the like. It will be understood that this representation shows a typical computer configuration; however, the present invention is not limited to this configuration but may be used for servers or embedded applications or the like.

The GPP 14 provides a general Von Neumann architecture including an arithmetic logic unit (ALU) 36, for example, implementing an out-of-order (OOO) processing of the type generally known in the art, in association with a program counter 38, one or more general-purpose registers 39, and the reorder buffer 40. The ALU 36 may implement a complete instruction set architecture including arithmetic instructions for addition, subtraction, multiplication, and division, branch instructions, bitwise operations instructions, and call instructions allowing for the saving of program state and transfer of program execution among different program blocks. For example, the GPP 14 may implement an x86 or similar instruction set, for example, providing a 32-bit instruction set comparable with the 80386 processor manufactured by Intel Corporation.

The GPP 14 may also include a power management circuit 35 for reducing the power consumed by the GPP 14, for example, during an inactive mode while no instructions are being executed, in contrast to an active mode when instruction execution is being performed, while retaining the architectural state, e.g., values of registers and other memory. The power management circuit 35, for example, may lower the voltage received by the various components of the GPP 14, or may lower the clock speed, or may completely or partially shut down various components not required for architectural state preservation, or may use a combination of these approaches.

The GPP 14, communicating through the high-level memory system 22 are, with other external memory 24, may execute all or part of an application program 42 comprised of multiple instructions 44 held in external memory 24. As will be discussed below, the GPP 14 may execute a transfer program 46 transferring execution of some of the instructions 44 of the application program 42 to the EDP 16. In executing this transfer program 46, the GPP 14 may access a prediction table 48 as will be described below to read from the prediction table 48 and update the statistics of the prediction table 48.

The EDP 16, in one embodiment, may include eight dataflow elements 54a-54h which will be used to process data. Each of the dataflow elements 54 includes an instruction management unit (IMU) 62, a compound functional unit (CFU) 64, and an output distribution unit (ODU) 66. Generally, the ODU 66 of each dataflow element 54 outputs data to other dataflow elements 54 on an output bus 56 managed by a bus arbiter 60. A dataflow input bus 58 from the bus arbiter 60 transfers data from the output bus 56 to selected IMUs 62. In one embodiment, the bus arbiter 60 may independently connect any output of an ODU 66 to one IMU 62 of a different dataflow element 54 to each of two different dataflow elements 54. This greatly simplifies the bus structure while providing suitable interconnectivity as will be described.

The EDP 16 also includes a store buffer 68. The store buffer 68 communicates between the high-level memory system 22, and each of the dataflow elements 54 to store and load data required by the various CFUs 64 as will be discussed in more detail below.

A transfer circuit 19 closely integrated with the EDP 16 provides for communication and control transfer between the GPP 14 and the EDP 16 over transfer lines 18. This transfer circuit 19 includes a configuration and initialization module 55 that may receive a dataflow description 65 for programming the EDP 16 over transfer line 18a as well as initial operand values 67 for transfer to the various dataflow elements 54 during a programming phase. The configuration and initialization module 55 communicates the received information to each of the IMUs 62 to provide for programming and initialization of each of the dataflow elements for execution of a particular portion of the application program 42. Specifically, the configuration and initialization module 55 communicates a dataflow description which describes the interconnections of the CFUs 64 and initial values (live in) for execution of that program portion.

The transfer circuit 19 also includes a completion transfer module 57 operating upon completion of the execution of the program by the EDP 16 to return control and selected operands 69 to the GPP 14 over transfer line 18b. The operand data 69 may be received from a single designated one of the ODU 66. The completion transfer module 57 may also control one or more control lines 21, for example, providing an interrupt to the GPP 14 to restart its operation and/or to trigger the power management circuit 35 to change the power operating mode of the GPP 14.

As will be discussed in greater detail below, the above-described components operate together to execute the application program 42 first by the GPP 14 until a portion of the application program 42 suited for the EDP 16 is encountered. At that time the portion of the application program 42 is transferred to the dataflow computer processor for execution to completion, upon which the EDP 16 returns control to the GPP 14 for continued execution of the application program. This transfer process may occur multiple times during the execution of the application program 42 for different portions. In one embodiment, the portion of the application program 42 transferred to the EDP 16 is limited to in-line nested loops as will be discussed below.

Referring now to FIG. 2, each IMU 62 may include an input control 71 that receives dataflow description 65 and initial operand values 67 from the configuration and initialization module 55 for initial programming. The input control 71 also receives data from other dataflow elements 54 over input bus 58. Generally, input control 71 decodes the dataflow description 65 into a set of dataflow function settings (for example, activating switching or deactivating various functional units 80 shown in FIG. 3 as will be described) stored in a configuration storage unit 70 and interconnection descriptions describing the data and control interconnections between the various functional units 80 stored in a destination storage unit 72. The operand values 67 received by the input control 71 are decoded into operands stored in an operand storage unit 74. Each of the configuration storage unit 70, the destination storage unit 72, and the operand storage unit 74 provide for multiple entries 75 each associated with a different internal execution cycle of the EDP 16, these multiple cycles used to leverage a limited number of dataflow elements to relatively large portions of the application program 42 transferred to the EDP 16.

Each IMU 62 also includes operation-ready logic 76 which communicates with the configuration storage unit 70, destination storage unit 72, and operand storage unit 74 to determine when data is available for each of multiple functional units 80 associated with the given dataflow element (by interrogating operand storage unit 74) and communicates with function selection logic 78 which activates the functional units 80, providing them with any necessary operands and providing destination information for interconnecting the functional units 80 in operation packet 77. Priority is given to the oldest ready instructions. Operation-ready logic 76 also tracks the internal cycles of the EDP 16 so as to move through the entries 75 of configuration storage unit 70, destination storage unit 72 and operand storage unit 74 appropriately as each cycle is complete.

Referring now to FIG. 3, the CFU 64 may receive the operation packet 77 from the function selection logic 78 at control circuitry 79. The control circuitry 79 decodes the operation packet 77 to activate and interconnect multiple functional units 80 for dataflow processing. The functional units 80 may include an arithmetic logic unit (ALU) 80*a*, a memory unit 80*b*, a decision unit 80*c*, multiplexers 80*d* and 80*e*, and demultiplexers or switches 80*f*, 80*g*, and 80*h*. Outputs from the switches 80*f*, 80*g*, and 80*h* are received by a correlator circuit 80*i* which collects this data for communication on the dataflow output bus 56.

The arithmetic logic unit ALU 80*a* may receive two operands 82 and an enable signal 84 from control circuitry 79 as provided by function selection logic 78 and, when enabled, may execute basic arithmetic and logical functions including addition, subtraction, multiplication, and division, as well as comparisons, Boolean logic functions and the like. The output of the arithmetic logic unit ALU 80*a* provides inputs to the memory unit 80*b* and to switch 80*f*.

The memory unit 80*b* works in conjunction with store buffer 68 (described above with respect to FIG. 1) to read and write values from the memory through the high-level memory system 22. The memory unit 80*b* may also receive directly from control circuitry 79 one operand and an enable signal 84. Data input to the memory unit 80*b* may be stored in memory 24 according to a storage address provided as part of the dataflow description 65 provided from function selection logic 78 and held for each cycle in the configuration storage unit 70. Outputs from the memory unit 80*b* provide data read from memory 24 according to a read address also provided as part of the dataflow description 65 provided from function selection logic 78 and held in the configuration storage unit 70.

The output from the memory unit 80*b* is provided to the decision unit 80*c* and to multiplexer 80*e*.

The decision unit 80*c* also receives an enable signal 84 from the control circuitry 79 and may make a decision providing a control output 87 based on a testing of the data received by the decision unit 80*c*. For example, the test may be to test the received data against a stored value to determine whether it is larger than or less than the stored value. The stored value is obtained from function selection logic 78 and held in the configuration storage unit 70 for the current internal loop.

The control output 87 of the decision unit 80*c* may be provided to each or any of the switches 80*f*, 80*g*, and 80*h*.

The switches 80*f*, 80*g*, and 80*h* each receive an input and switch among two data outputs according to the control output 87 which operates to determine a flow of the received data through either output of 80*f*, 80*g*, and 80*h* to different downstream data units 80 as passed through dataflow output bus 56. As noted switch 80*f* receives input from the output of the arithmetic logic unit ALU 80*a*, each of switches 80*g* and 80*h*, in contrast, receiving output from multiplexer 80*d* and 80*e*, respectively.

The multiplexers 80*d* and 80*e* are set to receive two inputs and to communicate one output to their respective switches determined by a setting from configuration storage unit 70 for the current loop. Multiplexer 80*d* receives the one input from the arithmetic logic unit ALU 80*a* at one input and at the second input receives a data element from control circuitry 79 implicitly from an upstream unit 80. The multiplexer 80*e* receives one input from the memory unit 80*b* and one input from control circuitry 79. Generally, by controlling the interconnection of the functional units 80, their settings (for example, switch positions, memory addresses or arithmetic operations) and their operand data, and a wide variety of conventional Von Neumann instructions, can be executed in dataflow form.

Figure 5:
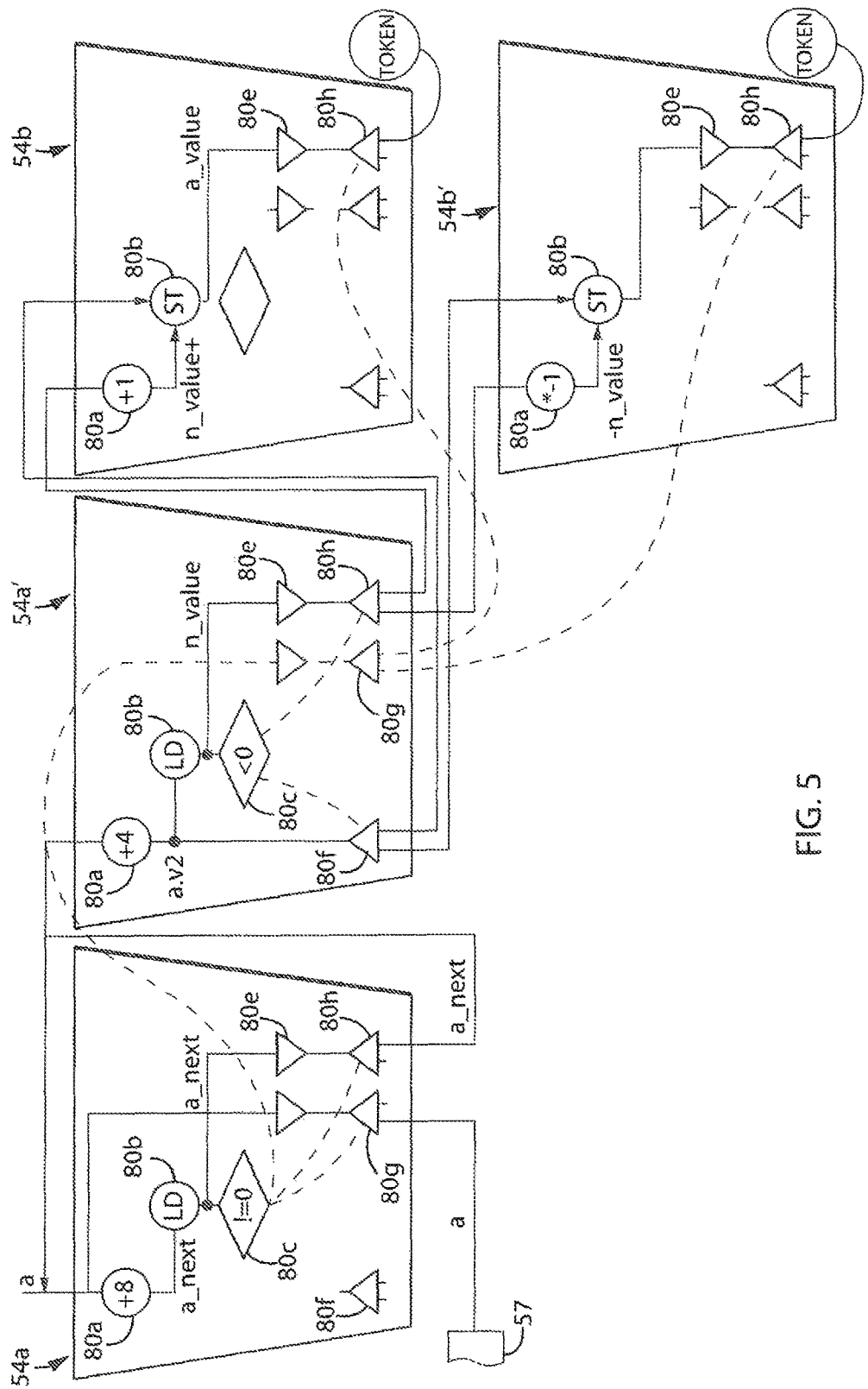
FIG. 5 is an example dataflow between two compound functional units (at different times) implementing a simple loop portion of an application program.

Referring now to FIG. 5, an example configuration of two dataflow elements 54*a* and 54*b* to execute a simple in-line nested loop may read through a linked list structure of the form:

```
struct A
{
    int v1, v2;
    A* next
}
```

As will be understood from the above representation, each element (designated "a") of the linked list provides two integers (v1 and v2) and a pointer to the next element in the linked list. The following loop may operate on this linked list:

```
while (a.next != 0)
{
    a = a.next;
    int n_val = a.v2;
    if(n_val<0)
    {
        a.v2 = -n_val;
    }
    else
    {
        a.v2 = n_val+1;
    }
}
```

In this loop, each linked list element "a" is processed so long as each value of "next" (a.next) for that list element a is not zero indicating the end of the linked list. In each iteration of the loop, the value v2 for that linked list element a (this value designated a.v2) is checked to see whether it is less than zero. If so, this value is inverted and if not this value is incremented.

This loop may be implemented in dataflow form using the EDP 16 configured as shown in FIG. 5. Only two CFUs 64 are needed in two dataflow elements 54*a* and 54*b*, with these two dataflow elements 54*a* and 54*b* being reconfigured into internal configurations as they process data. For clarity of description, the dataflow elements 54*a* and 54*b* in these different configurations will be termed dataflow element instances 54*a* and 54*b* for the first configuration and dataflow element instances 54*a*' and 54*b*' for the second configuration.

An initial value of "a", being a pointer to the first list element (initially from the GPP 14 and subsequently from previous cycles of the loop), is received by arithmetic logic unit ALU 80*a* of dataflow element instance 54*a* during a first instance. The arithmetic logic unit ALU 80*a* adds an offset to this pointer value (8 in this example assuming that each integer is two bytes) to obtain an address of the next list element (a.next). This address is provided to the memory unit 80*b* which fetches the value of a.next (a pointer) using the store buffer 68 (shown in FIG. 1) and passes this data value to decision unit 80*c*. Decision unit 80*c* tests this pointer value against zero.

As noted above, these values of the offset (8), the test value (not equal zero), as well as the activation of these various elements 80, and/or interconnection of these various elements 80 are all set for this particular instance by configuration storage unit 70 according to an entry 75 (shown in FIG. 1) for the current instance. This process of setting the units 80 will be assumed going forward and therefore not discussed.

The control output from decision unit 80*c* (shown by a dotted line but also treated as flowing data) is used to control switch 80*g* and switch 80*h*. This control value is also provided as an input to switch 80*h* in the next dataflow element instance 54*a'* as passed through dataflow output bus 56 and shown by a dotted line passing between dataflow element instances 54*a* and 54*a'* as will be discussed below.

If the value of a.next is equal to zero, then switch 80*g* is controlled to return the value "a" as a live-in value back to the GPP 14 through dataflow output bus 56 and transfer line 18. This signals that the loop has been concluded and begins the transfer of control back to the GPP 14.

Otherwise, the value of a.next is transferred via switch 80*h* (and through bus 56 and IMU 62 not shown for clarity) back to the input of arithmetic logic unit ALU 80*a* for the next execution of dataflow element instance 54*a* (two instances from the current instance) and to the arithmetic logic unit ALU 80*a* of dataflow element instance 54*a'* (for the next instance). This separation of outputs into different dataflow element instances 54*a* is possible because of the multiple entries 75 of operand storage unit 74 which may communicate data between different internal cycles of the EDP 16.

This next dataflow element instance 54*a'* receives new configuration data from configuration storage unit 70, destination storage unit 72 and operand storage unit 74. With this configuration the arithmetic logic unit ALU 80*a* receives the value of a.next and increments it by four to obtain an address for a.v2 for that current list element a. This address is provided to memory unit 80*b* and the value of a.v2 (loaded into the variable n_value in the program shown above) is tested at decision unit 80*c* see if it is less than zero. This value is also passed to switch 80*h* (via the configuration of multiplexer 80*e*).

The control output of decision unit 80*c* of dataflow element instance 54*a'* is used to control switches 80*f*, 80*g*, and 80*h* of dataflow element instance 54*a'*. If the value of n_value is less than zero, then the control output of decision unit 80*c* causes n_value to be input to the arithmetic logic unit ALU 80*a* of dataflow element instance 54*b'* where it is multiplied by −1. Alternatively, if the value of n_value is greater than or equal to zero, then the control output of decision unit 80*c* causes n_value to be input to the arithmetic logic unit ALU 80*a* of dataflow element instance 54*b* where it is incremented.

At dataflow element instance 54*b'*, the negated value of n_value passes to the input of the memory unit 80*b* of dataflow element instance 54*b'* where it is stored at the address [a.v2] received from switch 80*f* of dataflow element instance 54*a'*. The memory unit 80*b* also outputs a control signal 87 to switch 80*h*, controlled by a control signal from decision unit 80*c* of dataflow element instance 54*a* (that tests for the end of the linked list). If this is not the end of the linked list, switch 80*h* provides a signal to the store buffer 68 to create a write token for the desired writing by memory unit 80*b*. These tokens are used to retire reading and writing in the correct order Conversely at dataflow element instance 54*b*, the incremented value of n_value passes to the input of memory unit 80*b* of dataflow element instance 54*b* where it is stored at address [a.v2] received from switch 80*f* of dataflow element instance 54*a'*. Again, the memory unit 80*b* outputs a control signal to switch 80*h* controlled by the control signal from decision unit 80*c* of dataflow element instance 54*a* (that tests for the end of the linked list) so that if this is not the end of the linked list, memory unit 80*b* provides a signal to the store buffer 68 to create a write token for the desired writing by memory unit 80*b*.

Referring now to FIGS. 1 and 4, the transfer program 46 operates during execution of the application program 42 to detect the occurrence of a nested loop per decision block 90, and preferably an in-line nested loop. A nested loop as that term is used herein is an instruction loop (for example, employing a while-next or if-then logical construction) that does not include I/O operations or atomic operations. An in-line nested loop, as that term is used herein, is a nested loop that does not include a call to other instructions outside of the loop. At process block 92, the detected loop may be checked against prediction table 48 by using its program counter value as an index to determine if, in previous executions of the loop, a sufficiently long execution time or execution of a sufficient number of instructions was performed by the EDP 16 to justify the transfer. This table is updated after each execution of the given loop as discussed below. The value of the prediction table 48 necessary to justify transfer of the loop may be determined empirically and may be controlled dynamically in order to provide a flexible trade-off between energy consumption and performance speed or the like.

If the number of static instructions of the loop does not exceed the capacity of the EDP 16 and the prediction table 48 indicates that it is justified to transfer the loop to the EDP 16, then at decision block 94 control is transferred to the EDP 16 per process block 96 for execution of the identified loop. This transfer includes the necessary dataflow description 65 and initial operand values 67.

At process block 98, the GPP 14 is moved to a low power mode, for example, by reducing voltage or clock speed or shutting off nonessential components. Decision block 100 checks to see if the transferred loop has been completed by the EDP 16, for example, by return value through transfer line 18*b* or an interrupt or the like. If so, at process block 102*a* the prediction table 48 is updated with the most recent performance measurements of the performance of the EDP 16 in executing the transferred loop. This performance record is used at process block 92 as described above.

At process block 104, power (or clock speed) is restored to the GPP 14. At process block 106 control is restored to the GPP 14 and an updated value of its program counter is loaded to a value after the last instruction is transferred in the loop.

Referring now to FIGS. 6 and 7, in one embodiment, the application program 42 may be preprocessed by a compiler being a program executing on an electronic computer. The compiler may introduce markers 108 and configuration data 120 into the compiled object code of the application program 42 executed by the computer 12, these markers 108 and configuration data 120 assisting in implementing the transfer process of the present invention. Normally these markers 108 will be in the form of special instructions. Specifically, during the compilation process as indicated by process block 110, control flow loops 119 in the application program 42 maybe detected and at decision block 112 the detected loops may be checked to see if the number of static instructions (that is instructions in a single loop iteration) is below a predetermined number of instructions that can implemented by the EDP 16 and the static instructions are within the hardware capabilities of the EDP 16. In one embodiment the number of entries 75 (shown in FIG. 2) may provide for dataflow execution of thirty-two compound instructions (typically representing several static instructions of the application program 42). This checking of static loop length considers both the detected loop and loops within the detective loop (nested loops) and called functions the detected or nested loop.

If the size limit is not exceeded, then at process block 114 the loop is recast as an in-line loop 116 by moving any called instructions into the main loop body to provide a reformed in-line loop of multiple instructions.

At process block 117, the reformed loop 116 is converted to configuration data 120 for the EDP 16 including the dataflow description 65, and initial operand values 67 are provided that can be transferred to the dataflow processor at the time of execution of the loop 119. This configuration data 120 captures the logic of loop 119 and may be marked with a begin instruction 108*a* and optionally an end instruction 108*b* to facilitate isolation of the configuration data 120 during execution of the application program 42 by the transfer program 46.

The original loop 119 is preserved for example as marked by an end tag 108*b* and a restart tag 108*c* per process block 121. This allows the original loop 119 to be preserved and executed directly in the event that the prediction table 48 indicates that the execution by the EDP 16 does not make sense based on dynamic measurements. The address of the restart instruction 108*c* may provide a value to be loaded into the program counter 38 of the GPP 14 when control is returned to the GPP 14 allowing resumption of execution of the rest of the program after the targeted loop.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A computer with improved function comprising:
    a general computer processor providing:
        (a) a memory interface for exchanging data and instructions with an electronic memory;
        (b) an arithmetic logic unit receiving input data and instructions from the memory interface to process the same and to provide output data to the memory interface; and
        (c) a program counter identifying instructions for execution by the arithmetic logic unit;
    a dataflow computer processor providing:
        (a) a memory interface for exchanging data and instructions with electronic memory;
        (b) multiple functional units interconnected to receive input data from the memory interface or other functional units and provide output data to the memory interface or other functional units, including interconnections between functional units allowing conditional branches to either of two functional units, wherein the functional units execute in a sequence determined by the availability of data, and
        (c) an interconnection control circuit controlling the interconnection of the multiple functional units to exchange data according to the dataflow description; and
    a transfer interface operating to transfer the execution of an application program between the general purpose computer processor and the dataflow computer processor:
        (a) at a beginning of a set of instructions of the application program identified as executable on the dataflow computer processor, switching execution from the general computer processor to the dataflow computer processor and providing to the dataflow computer processor a dataflow description of the set of instructions; and
        (b) at a completion of execution of the set of instructions by the dataflow computer processor, returning execution to the general computer processor.

2. The computer of claim 1 wherein the general computer processor includes a low-power operating mode and a high-power operating mode where the low-power operating mode consumes less power than the high-power operating mode and wherein the computer moves the general computer processor to the low-power mode at the beginning of the set of instructions and to the high-power mode at the completion of execution of the set of instructions.

3. The computer of claim 1 further including a prediction table tracking execution on the dataflow computer processor of the set of instructions of the application as linked to the set of instructions, wherein the computer switches execution from the general computer processor to the dataflow computer processor for a given set of instructions only when the prediction table tracking for previous execution of a given set of instructions indicates likelihood of a predetermined benefit in execution of the transfer.

4. The computer of claim 3 wherein the tracking tracks at least one of execution time and number of executed instructions.

5. The computer of claim 1 wherein the functional elements of the dataflow processor execute in multiple sequential time steps in between which configuration of functional units of the functional elements and interconnection of the functional units is changed.

6. The computer of claim 5 wherein the dataflow computer processor includes registers for storage of data between time steps.

7. The computer of claim 1 wherein the computer identifies in-line instruction loops providing one or more loops of control flow without input-output operations as the set of instructions for transfer to the dataflow processor.

8. The computer of claim 1 wherein the general computer processor executes a transfer program identifying a beginning of the set of instructions and enabling operation of the transfer interface in switching execution from the general computer processor to the dataflow computer processor and wherein the dataflow computer processor executes the dataflow description to identify a completion of execution of the set of instructions to enable operation of the transfer interface and returns execution to the general computer processor.

9. The computer of claim 1 wherein the general computer processor is capable of executing the entire application program including the set of instructions.

10. The computer of claim 1 wherein the general computer processor adjusts its program counter upon completion of the execution of the instruction set to an instruction after the set of instructions.

11. The computer of claim 1 wherein the transfer circuit at the beginning of the set of instructions further transfers initial data values for the functional units.

12. The computer of claim 1 wherein the beginning of the set of instructions is identified from special instructions embedded in the application program.

13. The computer of claim 1 wherein the dataflow description is embedded in the application program executed by the general computer processor.

14. The computer of claim 1 wherein the set of instructions is limited to predefined maximum number of static instructions.

15. The computer of claim 1 wherein the multiple functional units of the dataflow computer are interconnected by a bus structure that may interconnect only a subset less than the full set of functional units at a given time.

16. The computer of claim 1 wherein the general computer processor and dataflow computer processor both communicate with a common cache through the memory interfaces.

17. The computer of claim 1 wherein the multiple functional units include at least one demultiplexer connecting data along two data paths each communicating with another functional unit.

18. The computer of claim 1 wherein the memory interface includes circuitry for retiring memory write operations to memory in correct order.

19. The computer of claim 1 wherein the functional units are selected from the group consisting of dedicated: adders, subtractors, multipliers, dividers, and Boolean logic elements.

20. A method of executing an application program on a hybrid general-purpose dataflow computer having:
a general computer processor providing:
(a) a memory interface for exchanging data and instructions with an electronic memory;
(b) an arithmetic logic unit receiving input data and instructions from the memory interface to process the same and to provide output data to the memory interface; and
(c) a program counter identifying instructions for execution by the arithmetic logic unit;
a dataflow computer processor providing:
(a) a memory interface for exchanging data and instructions with electronic memory;
(b) multiple functional units interconnected to receive input data from the memory, interface or other functional units and provide output data to the memory interface or other functional units, including interconnections between functional units allowing conditional branches to either of two functional units, wherein the functional units execute in a sequence determined by the availability of data, and
(c) an interconnection control circuit controlling the interconnection of the multiple functional units to exchange data according to the dataflow description;
a transfer interface operating to transfer the execution of an application program between the general purpose computer processor and the dataflow computer processor:
(a) at a beginning of a set of instructions of the application program executable on the dataflow computer processor, switching execution from the general computer processor to the dataflow computer processor and providing to the dataflow computer processor a dataflow description of the set of instructions; and
(b) at a completion of execution of the set of instructions by the dataflow computer processor, returning execution to the general computer processor;
the method comprising the steps of:
(1) executing a first portion of the application program on the general computer processor while suspending operation of the dataflow processor; and
(2) executing a second portion of the application program identified for execution by the dataflow processor on the dataflow processor while suspending operation of the general computer processor.

21. A computer executing a compiler program to provide an application program for execution on a hybrid general-purpose dataflow computer having:
a general computer processor comprising:
(a) a memory interface for exchanging data and instructions with an electronic memory;
(b) an arithmetic logic unit receiving input data and instructions from the memory interface to process the same and to provide output data to the memory interface; and
(c) a program counter identifying instructions fir execution by the arithmetic logic unit;
a dataflow computer processor providing:
(a) a memory interface for exchanging data and instructions with electronic memory;
(b) multiple functional units interconnected to receive input data from the memory interface or other functional units and provide output data to the memory interface or other functional units, including interconnections between functional units allowing conditional branches to either of two functional units, wherein the functional units execute in a sequence determined by the availability of data, and (c) an interconnection control circuit controlling the interconnection of the multiple functional units to exchange data according to the dataflow description;

(e) a store buffer retiring writing to memory and reading from memory in correct program order; and a transfer interface operating to transfer the execution of an application program between the general purpose computer processor and the dataflow computer processor:

(a) at a beginning of a set of instructions of the application program previously identified as executable on the dataflow computer processor, switching execution from the general computer processor to the dataflow computer processor and providing to the dataflow computer processor a dataflow description of the set of instructions; and (b) at a completion of execution of the set of instructions by the dataflow computer processor, returning execution to the general computer processor;

the computer executing the compiler program to:

(1) identify a program portion of an application program executable on the computer program for execution on the dataflow computer processor;

(2) convert instructions of the program portion to dataflow descriptions for receipt by the dataflow computer processor to execute the program portions; and (3) place at least one marker in the application program signaling the location of the program portions.

22. The computer of claim 21 wherein the computer further executes the compiler to insert the dataflow descriptions into the application program while retaining the program portion in the application program.

23. The computer of claim 21 wherein the identified program portion is a loop and the computer further executes the compiler to convert the loop into an in-line nested loop without calls to other program portions.

* * * * *